United States Patent
Huang

(10) Patent No.: US 8,262,230 B2
(45) Date of Patent: Sep. 11, 2012

(54) PROJECTION SYSTEM

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 240 days.

(21) Appl. No.: 12/791,449

(22) Filed: Jun. 1, 2010

(65) Prior Publication Data

US 2010/0238413 A1   Sep. 23, 2010

Related U.S. Application Data

(63) Continuation-in-part of application No. 12/233,766, filed on Sep. 19, 2008, now abandoned.

(30) Foreign Application Priority Data

Jun. 4, 2008 (TW) ............................. 97120760 A
Jun. 1, 2009 (TW) ............................. 98117959 A

(51) Int. Cl.
*G03B 21/14* (2006.01)

(52) U.S. Cl. ............... 353/94; 353/81; 353/20; 348/771

(58) Field of Classification Search .................... 353/33, 353/20, 81, 94; 348/742, 743, 771
See application file for complete search history.

(56) References Cited

U.S. PATENT DOCUMENTS

| | | | |
|---|---|---|---|
| 6,349,006 B1 * | 2/2002 | Okamori et al. ............... 359/834 |
| 7,207,678 B2 * | 4/2007 | Penn ................................ 353/81 |
| 7,810,930 B2 * | 10/2010 | Miyazawa et al. ............... 353/31 |
| 2003/0218794 A1 * | 11/2003 | Takeda et al. .................. 359/292 |
| 2004/0109146 A1 * | 6/2004 | Liao et al. ........................ 353/98 |
| 2004/0165155 A1 * | 8/2004 | Lee et al. ......................... 353/81 |
| 2007/0177107 A1 * | 8/2007 | Piehler ............................. 353/33 |
| 2010/0238413 A1 * | 9/2010 | Huang ............................. 353/33 |

* cited by examiner

*Primary Examiner* — William C Dowling
(74) *Attorney, Agent, or Firm* — Grossman, Tucker, Perreault & Pfleger, PLLC

(57) ABSTRACT

A projection system is provided. The projection system comprises a first light source module, a second light source module, a prism module, a projection lens and a digital micromirror device (DMD). The two light source modules provide a first light beam and a second light beam according to the specific timing sequences respectively. The prism module is defined with a first reflection mechanism and a second reflection mechanism. The DMD comprises a plurality of micro mirrors. After traveling into the prism module and being reflected by the first reflection mechanism, the first light beam is emitted onto the micro mirrors. The first light beam is adapted to be reflected onto the projection lens and images onto the screen while the micro mirrors are tilted at a first angle. After traveling into the prism module and being reflected by the second reflection mechanism, the second light beam is emitted onto the micro mirrors. The second light beam is adapted to be reflected onto the projection lens and images onto the screen while the micro mirrors are tilted at a second angle. The two light source modules would be switched therebetween according to the specific timing sequences and specific angles of the micro mirrors.

19 Claims, 8 Drawing Sheets

PROJECTION SYSTEM

This application claims priority to Taiwan Patent Application No. 098117959 filed on Jun. 1, 2009, and is a continuation-in-part application of U.S. patent application Ser. No. 12/233,766 filed on Sep. 19, 2008, which claims priority to Taiwan Patent Application No. 097120760 filed on Jun. 4, 2008, all of the teachings are hereby incorporated by reference in their entirety.

CROSS-REFERENCES TO RELATED APPLICATIONS

Not applicable.

BACKGROUND OF THE INVENTION

1. Field of the Invention

The present invention provides a projection system. In particular, the projection system utilizes a digital micromirror device to switch between two light source modules.

2. Descriptions of the Related Art

With the rapid development of science and technology, information display technology has been advancing at a fast pace and, accordingly, projectors have become increasingly popular as well. In addition to the more frequent use in offices and meeting rooms, projectors have also gradually become an indispensable household appliance for entertainment. Among projectors employing various display technologies, digital light processing (DLP) projectors that employ core technology and elements from Texas Instruments Inc., U.S. have gradually become the mainstream product due to advantages such as high contrast ratio, small volume and light weight. In an effort to improve the reliability of the projectors, extend the service life of the light sources and increase the display luminance, a dual-light-source module comprising two light sources that are switched alternately according to a time sequence has been proposed in the art to improve the display quality of the DLP projectors.

As shown in FIG. 1, a projection apparatus 1 of the prior art is depicted therein. The projection apparatus 1 comprises a light source system 11 and an imaging system 13. The light source system 11, which is adapted to provide light beams necessary for imaging, comprises a mirror wheel 111, a first light source module 113, a second light source module 115 and a controller (not shown). The mirror wheel 111 has a plurality of reflective regions and a plurality of transmissive regions arranged alternately to coordinate with the switching between the first light source module 113 and the second light source module 115. Each of the light source modules 113, 115 comprises a green light-emitting diode (LED), a red LED and a blue LED.

The controller is configured to control the first and the second light source modules 113, 115 to emit light beams according to the first and the second main time sequences to form a first light beam for projecting onto the reflective regions of the mirror wheel 111 and a second light beam for projecting onto the transmissive regions of the mirror wheel 111. The first and the second light beams thus generated then travel via the reflective regions and the transmissive regions of the mirror wheel 111 respectively into the imaging system 13 for imaging.

In the conventional projection apparatus 1, since the mirror wheel 11 is driven by a motor, the apparatus as a whole has an increased volume and generates noise. Furthermore, as a mechanical rotating structure, the mirror wheel 111 delivers a slow switching speed, which causes light dissipation and decreases the instantaneous luminous flux when switching according to the time sequence or in the border regions between the reflective regions and the transmissive regions.

FIG. 2 illustrates another conventional projection apparatus 2 with two light sources. The projection apparatus 2 comprises a light source system 21 and an imaging system 23. The light source system 21, which is adapted to provide light beams necessary for imaging, comprises a first light source (not shown), a second light source (not shown), a color wheel 211, a light source driver 213, a digital micromirror device (DMD) driver 215 and a first DMD 217. The DMD driver 215 is configured to output a first control signal 210a and a second control signal 210b for controlling a plurality of micro mirrors on the first DMD 217 to tilt at a first angle 212a or a second angle 212b respectively.

In response to the first time sequence, the first light source generates a first light beam 214a that is projected onto the first DMD 217. After being reflected by the micro mirrors (not shown) of the first DMD 217 which have been tilted at the first angle 212a, the first light beam 214a then travels through the color wheel 211 before being projected to the imaging system 23. Likewise, in response to the second time sequence, the second light source generates a second light beam 214b that is projected onto the first DMD 217. After being reflected by the micro mirrors of the first DMD 217 which have been tilted at the second angle 212b, the second light beam 214b then travels through the color wheel 211 before being projected to the imaging system 23. In response to the first light beam 214a and the second light beam 214b, a second DMD 231 included in the imaging system 23 then adjusts the micro minors (not shown) thereof respectively to project the images onto a screen 233.

In the prior art, the projection apparatus 2 controls the first DMD 217 to switch between the two light sources according to a signal. As compared to the projection apparatus 1, this delivers a faster switching speed and smaller overall volume. However, compared with other projection apparatuses, the additional first DMD 217 leads to extra light dissipation, resulting in the decrease of the imaging luminance. Moreover, the additional DMD remarkably increases the costs of the apparatus.

It follows from the above description that the existing projection apparatuses either switches between the light sources in a mechanical manner with poor efficiency, or switches between the light sources by using an expensive DMD with decreased luminance and increased costs. Accordingly, it is important to find a way for a projection apparatus with two light sources to be switched quickly while still achieving high reliability, prolonged light source service life and improved imaging luminance. In addition, the projection apparatus should also have a smaller volume, decreased costs and higher imaging quality.

SUMMARY OF THE INVENTION

One objective of this invention is to provide a projection system which, based on a structure with two light source modules, employs a preexisting DMD to control the switching between the light source modules with a sequence of electronic signals. This arrangement not only prolongs the service life of the light sources and consequently enhances the reliability of the system, but also enhances the total brightness, increases the switching speed, decreases the light dissipation, reduces the costs and decreases the overall volume.

The projection system of this invention comprises a first light source module, a second light source module, a prism module, a DMD and a lens device. The first and the second light source modules are adapted to provide a first and a second light beams respectively according to a predetermined time sequence for projection into the prism module. The prism module comprises three prisms and two air gaps to define a first and a second reflection mechanisms. Upon receiving the first and second light beams from the first and the second light source modules respectively, the prism module reflects the light beams to the DMD by using the first and second reflection mechanisms. A plurality of micro mirrors of the DMD is adapted to tilt at the first or second angle. When positioned at the first angle, the plurality of micro mirrors is adapted to image the first light beam and project the image onto a screen. On the other hand, when positioned at the second angle, the plurality of micro mirrors is adapted to image the second light beam and project the image onto the screen. By controlling the positioning angles of the micro mirrors in the preexisting DMD with a sequence of electronic signals, the light source module can be chosen to emit light according to a time sequence, thus allowing the apparatus to switch between the light sources.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 1:
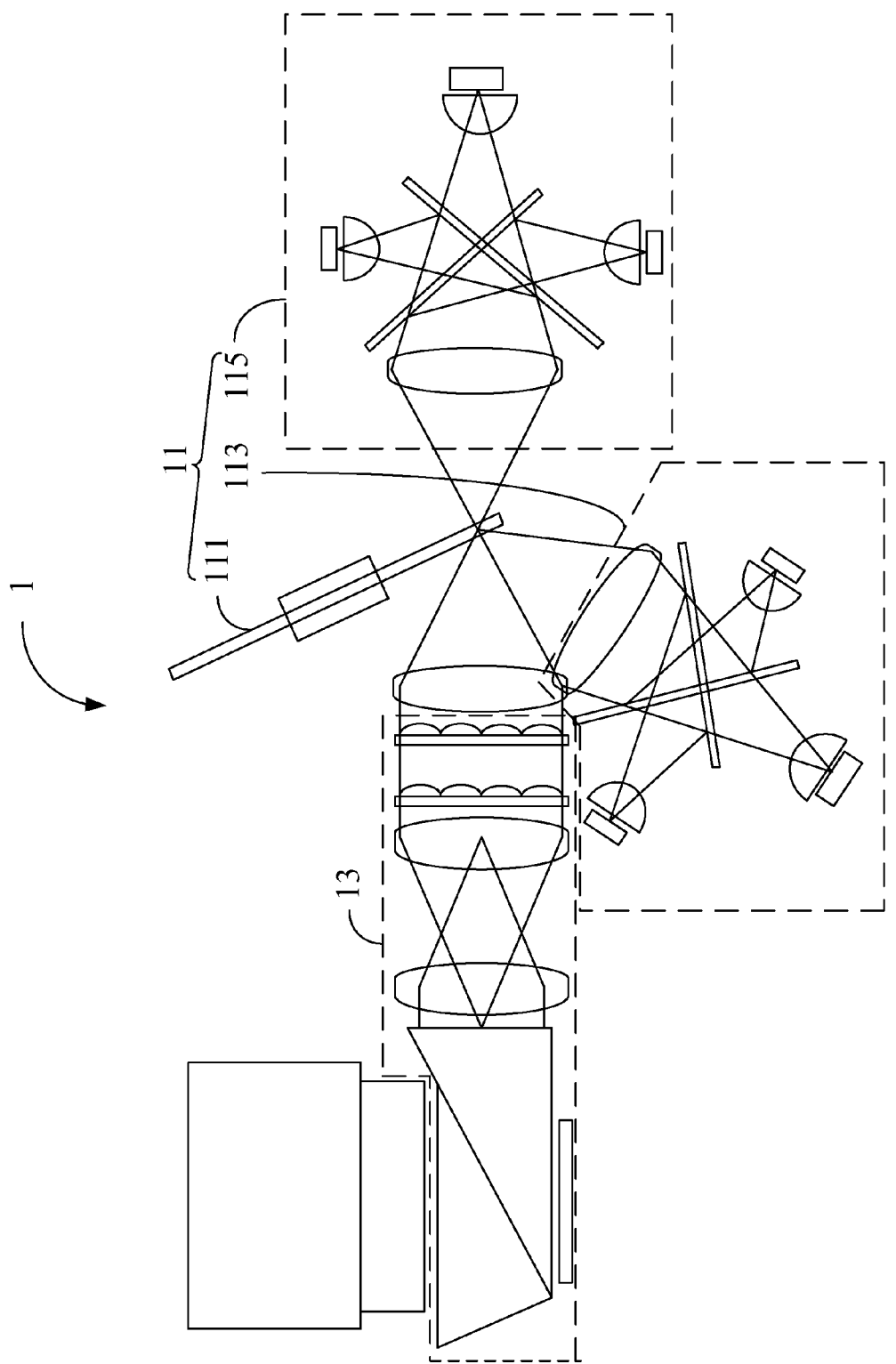
FIG. 1 is a schematic view of a conventional projection apparatus.
Figure 2:
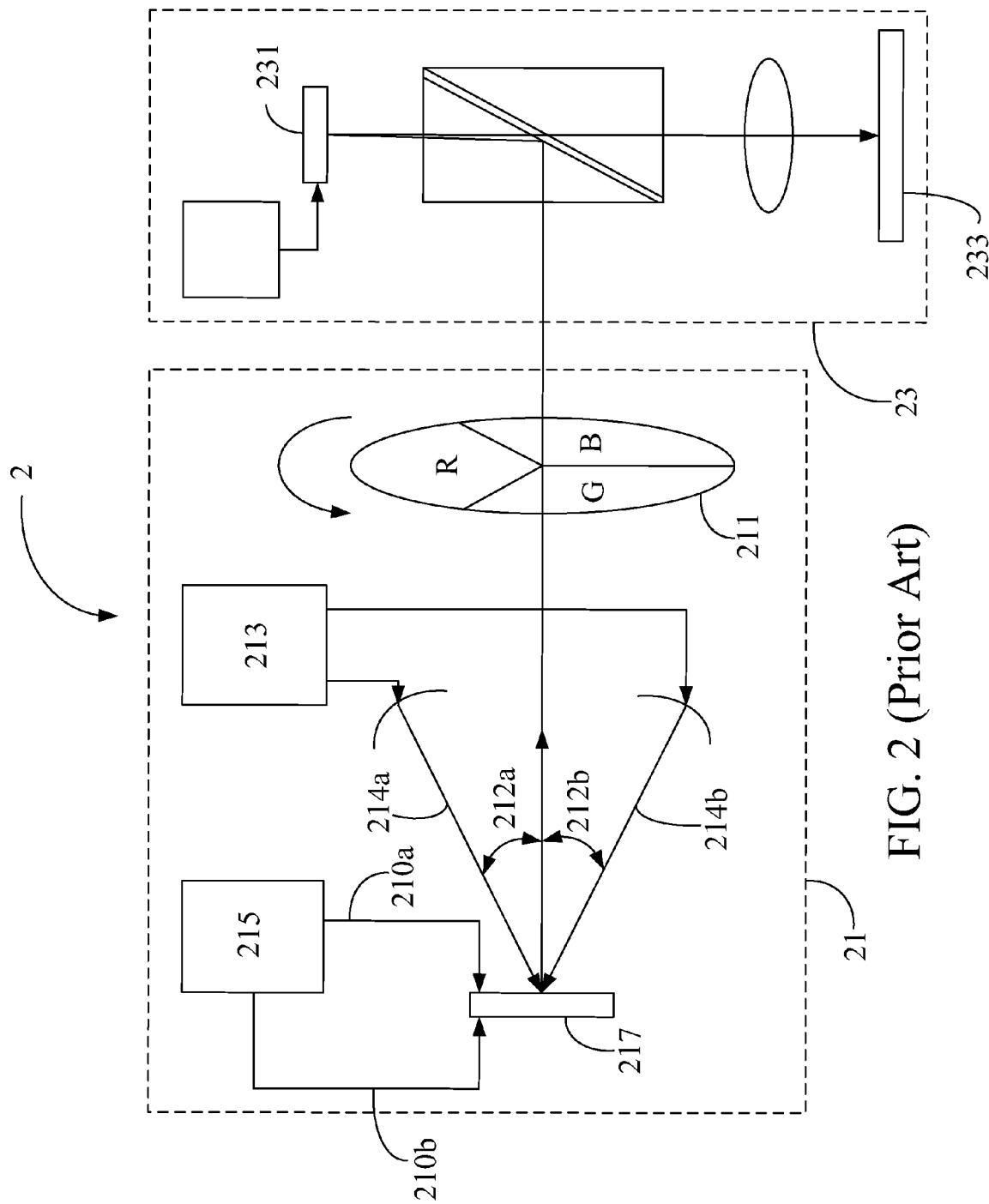
FIG. 2 is a schematic view of another conventional projection apparatus.
Figure 3A:
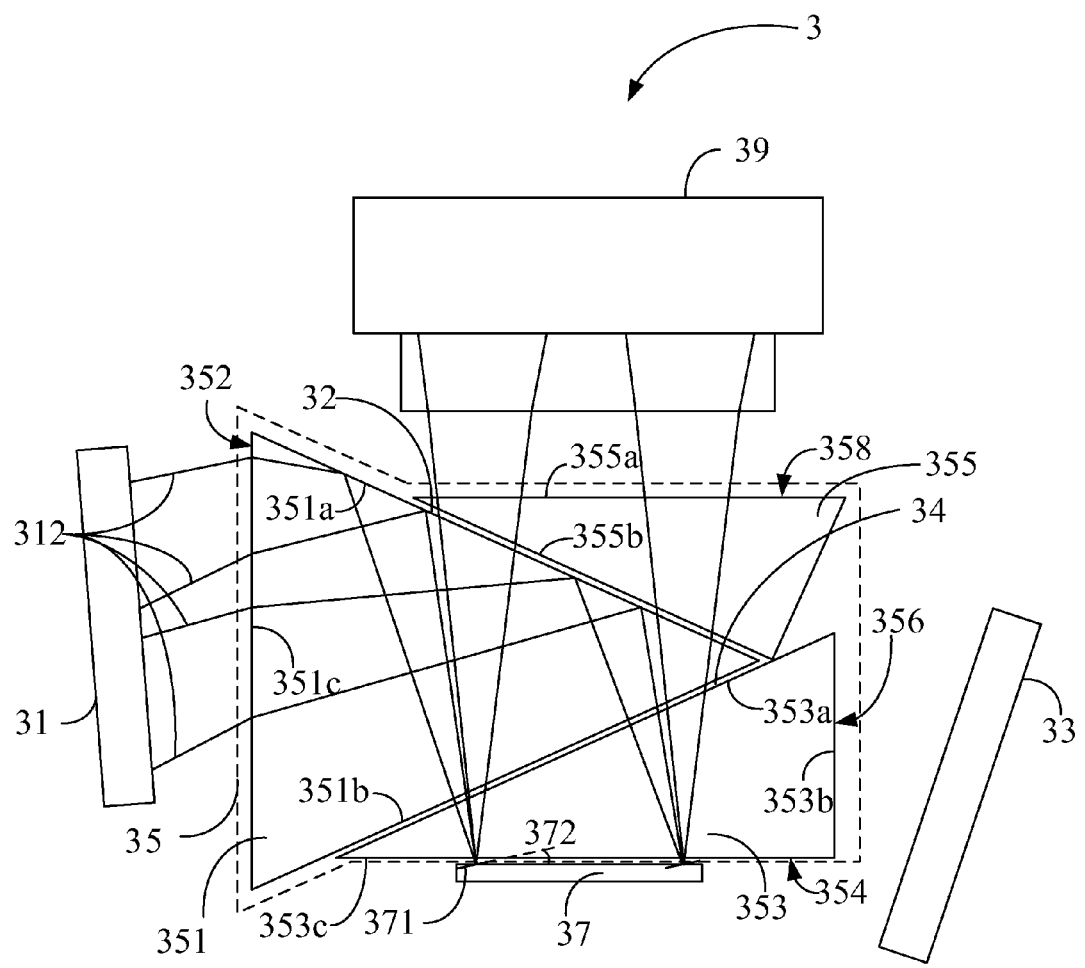
FIG. 3A is a schematic view illustrating the light path of the first light beam in the projection system according to the first embodiment of this invention.
Figure 3B:
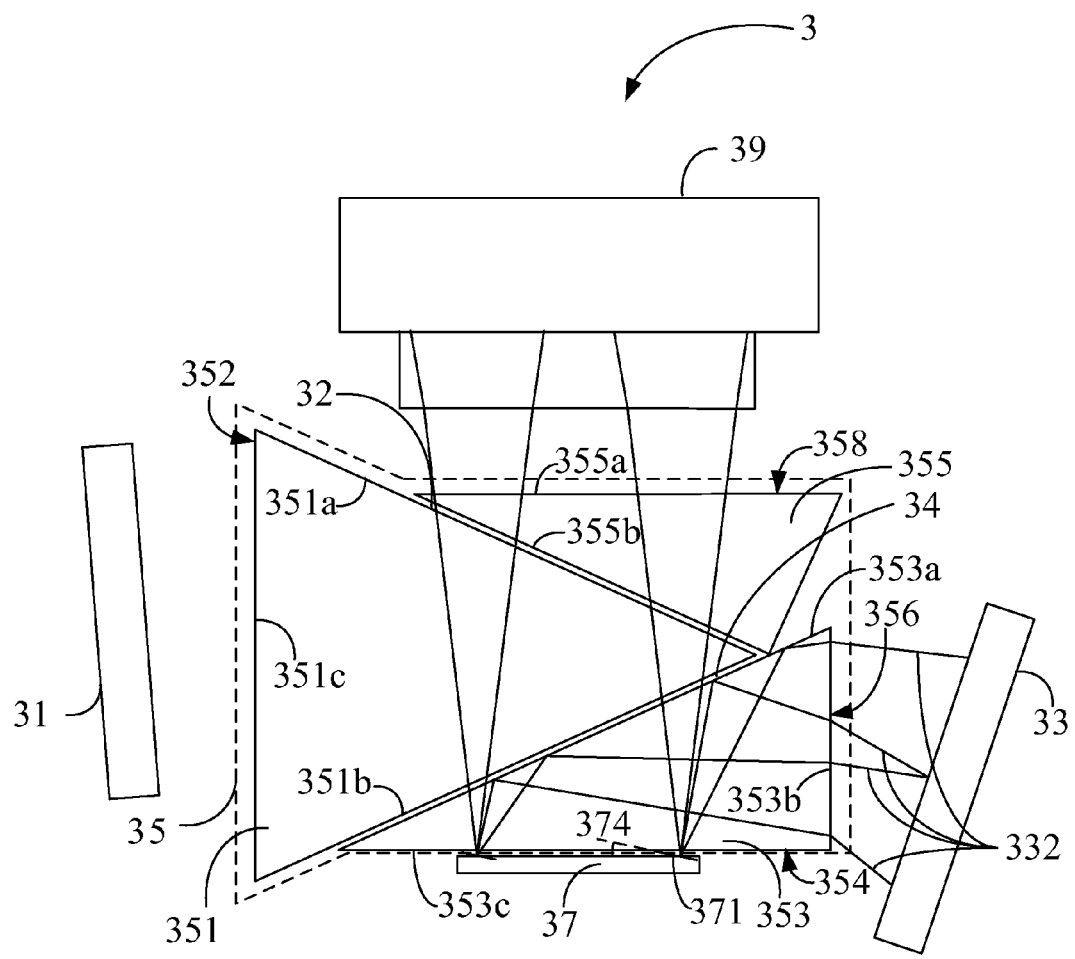
FIG. 3B is a schematic view illustrating the light path of the second light beam in the projection system according to the first embodiment of this invention.
Figure 5:
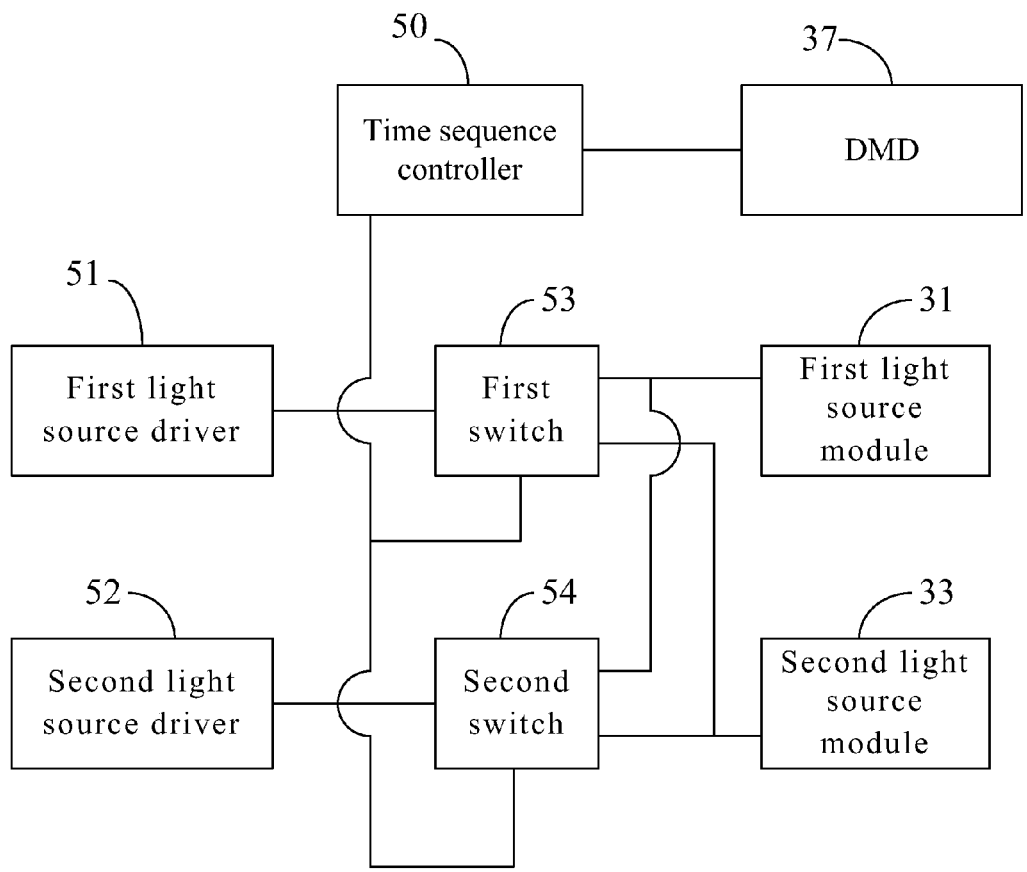
FIG. 5 is diagram illustrating the electrical connections among components in the first embodiment of this invention.

The first embodiment of this invention is a projection system 3. FIGS. 3A and 3B illustrate the light paths of the first embodiment, and FIG. 5 illustrates a circuit diagram of the first embodiment. In this embodiment, the projection system 3 is a digital light processing (DLP) projector. The projection system 3 comprises two light source modules: a first light source module 31 and a second light source module 33. The projection system 3 further comprises a prism module 35, a DMD 37, a lens device 39, a time sequence controller 50, a first light source driver 51, a second light source driver 52, a first switch 53 and a second switch 54. It should be noted that for purposes of illustration and simplicity of the attached drawings, some optical components of the projection system 3 are omitted from description and depiction. Furthermore, the dimensions of and spacing among the aforesaid components (e.g., the first light source module 31, the second light source module 33 and the prism module 35) are only provided for illustration and are not depicted to scale; likewise, the relative positions among the components are also not limited to what is described herein, and other embodiments may readily occur to those skilled in the art.

Through the appropriate circuit configuration, the first and the second light source modules 31, 33 are adapted to provide a first and a second light beams 312, 332 respectively. Specifically, referring to FIG. 5, the first light source driver 51 is electrically connected to the first and the second light source modules 31, 33 via the first switch 53. The second light source driver 52 is electrically connected to the first and the second light source modules 31, 33 via the second switch 54. The time sequence controller 50 is electrically connected to the first and the second switches 53, 54.

The time sequence controller 50 outputs a preset first and a preset second time sequence signals which represent a first time sequence and a second time sequence respectively. Both the first and second time sequence signals are transmitted to the first switch 53, second switch 54 and DMD 37 to control the light source modules 31, 33 so that the light beams necessary for imaging are supplied alternately according to the time sequence signals.

More specifically, the time sequence controller 50 outputs the first time sequence signal (equivalent to a voltage pulse) to the first and second switches 53, 54 so that the current supplied from the first and the second light source drivers 51, 52 flows therethrough to drive the first light source module 31. As a result, the first light source module 31 emits the first light beam 312, while the second light source module 33 emits no light beam. On the other hand, the time sequence controller 50 also controls the DMD 37 with the first time sequence signal.

The time sequence controller 50 outputs the second time sequence signal (equivalent to another voltage pulse) to the first and the second switches 53, 54 so that the current supplied from the first and the second light source drivers 51, 52 flows therethrough to drive the second light source module 33. As a result, the second light source module 33 emits the second light beam 332, while the first light source module 31 emits no light beam. On the other hand, the time sequence controller 50 also controls the DMD 37 with the second time sequence signal.

It should be noted that the configuration and number of the aforesaid time sequence controller(s) 50 are not limited to what is described herein. For example, time sequence controllers 50 may be disposed in the light source modules 31, 33 respectively to provide the light source modules 31, 33 with control signals in time sequence.

The prism module 35 comprises a first prism 351, a second prism 353 and a third prism 355, and further has a first light input surface 352, a first light output surface 354, a second light input surface 356 and a second light output surface 358. In this embodiment, the prism module 35 is a total internal reflection (TIR) prism. The first prism 351 has a first lateral side 351a, a second lateral side 351b and a bottom side 351c, while the second prism 353 has an inclined side 353a, a lateral side 353b and a bottom side 353c. Similarly, the third prism 355 has an inclined side 355a and a bottom side 355b.

The first lateral side 351a of the first prism 351 and the bottom side 355b of the third prism 355 are adjacent to and correspond to each other with a first air gap 32 defined therebetween. Thus, the first air gap 32 cooperates with the first and the third prisms 351, 355 on both sides to form the first reflection mechanism. The second lateral side 351b of the first prism 351 and the inclined side 353a of the second prism 353 are adjacent to and correspond to each other with a second air gap 34 defined therebetween. Thus, the second air gap 34 cooperates with the first and the second prisms 351, 353 on both sides to form the second reflection mechanism.

Meanwhile, the bottom side 351c of the first prism 351 defines the first light input surface 352 of the prism module 35. The lateral side 353b and the bottom side 353c of the second prism 353 define the second light input surface 356 and the first light output surface 354 of the prism module 35 respectively. The inclined side 355a of the third prism 355 defines the second light output surface 358 of the prism module 35.

Figure 4:
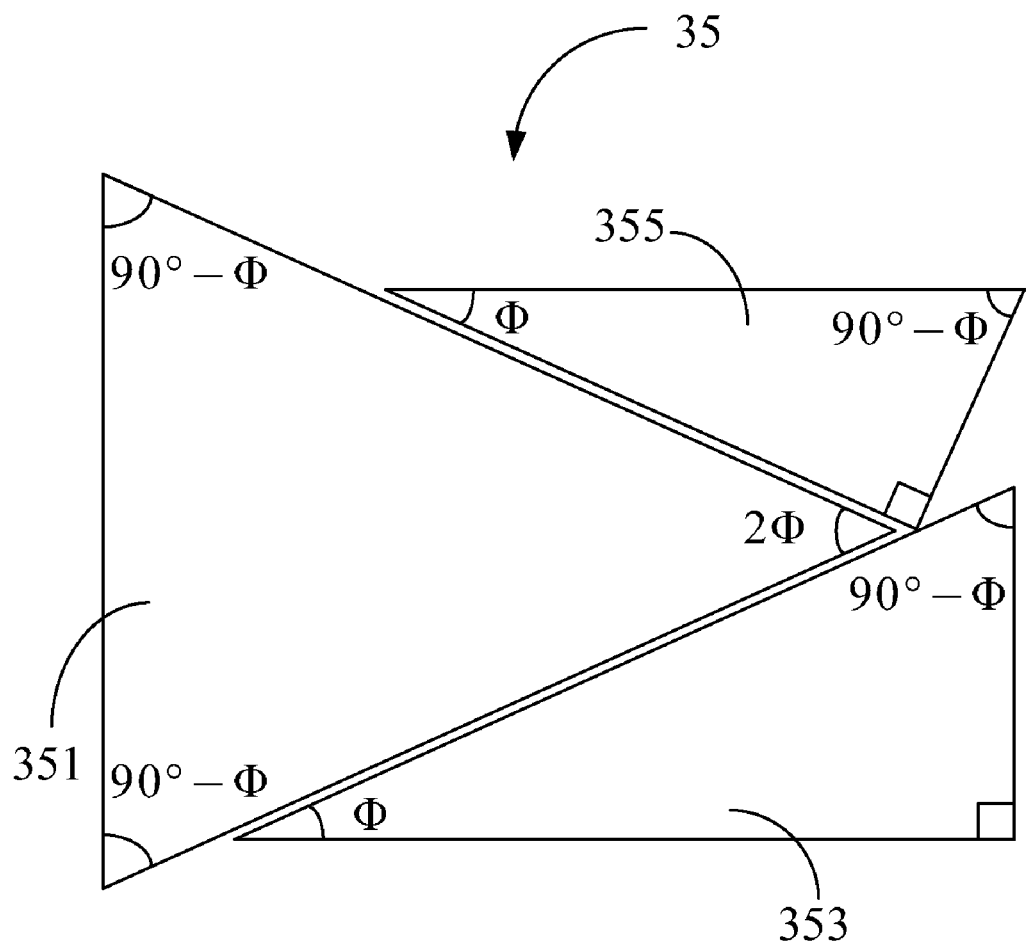
FIG. 4 is a schematic view illustrating the inner angles of the individual prisms in the prism module of the projection system according to the first embodiment of this invention.

In this embodiment, each of the prisms has an index of refraction "n". As shown in FIG. 4, the first prism 351 is an isosceles triangle with a first inner angle 2Φ, which is the apex angle of the isosceles triangle. The second and the third prisms 353, 355 are both right triangles and each has a second inner angle Φ. In other preferred embodiments, the first prism 351 may be an equilateral triangle.

In reference back to FIGS. 3A and 3B, the DMD 37 is disposed adjacent to the first light output surface 354 and has a plurality of micro mirrors 371 (only some of them are depicted) adapted to face towards the first light output surface 354. As described above, the DMD 37 is electrically connected to the time sequence controller 50. When outputting the first time sequence signal, the time sequence controller 50 further transmits information related to the image (e.g. a first image signal) to the DMD 37 to control the micro mirrors 371 to tilt at the first angle 372. When outputting the second time sequence signal, the time sequence controller 50 further transmits information related to the image (e.g. a second image signal) to the DMD 37 to control the micro mirrors 371 to tilt at the second angle 374. The first angle 372 and the second angle 374 are substantially equivalent angles in symmetry.

The first and the second angles 372, 374 to which the micro mirrors 371 are tilt are assumed to have an absolute value of δ, and according to the corresponding relationships between the angles, a formula is defined as follows: $\Phi = \sin^{-1}(1/n) - \sin^{-1}(\sin \delta / n)$. Based on this formula, those skilled in the art may come up with different embodiments by adjusting the three variables in association, i.e., the angle Φ of the prism, the index of refraction "n" of the prism and the absolute value δ to which the micro mirrors are tilted. For example, the first and the second angles 372, 374 in this embodiment both have an absolute value (i.e. δ) of 12°.

The lens device 39 is disposed adjacent to the second light output surface 358, and is adapted to focus the first and the second light beams 312, 332 from the first and the second light source modules 31, 33 to project an image. The operational processes of the individual components and associated light paths will be detailed hereinafter.

As shown in FIG. 3A, when the first light source module 31 receives the first time sequence signal, the first light beam 312 is generated according to the first time sequence. The first light beam 312 is transmitted into the prism module 35 through the first light input surface 352 and, after being reflected by the first reflection mechanism, the first light beam 312 is transmitted out through the first light output surface 354 and then projected onto the micro mirrors 371 of the DMD 37. Simultaneously, the time sequence controller 50 further controls the micro mirrors 371 to tilt at the first angle 372 according to the information related to the image, so that the first light beam 312 is imaged and reflected therefrom. Subsequently, the first light beam 312 travels back into the prism module 35 through the first light output surface 354, and then exits from the second light output surface 358 to travel into the lens device 39, where it is focused and projected onto a screen (not shown) to form an image.

Next, as shown in FIG. 3B, when the second light source module 33 receives the second time sequence signal, the second light beam 332 is generated according to the second time sequence. The second light beam 332 is transmitted into the prism module 35 through the second light input surface 356. After being reflected by the second reflection mechanism, the second light beam 332 is transmitted out through the first light output surface 354 and then projected onto the micro mirrors 371 of the DMD 37. Simultaneously, the time sequence controller 50 further controls the micro mirrors 371 to tilt at the second angle 374 according to the information related to the image, so that the second light beam 332 is imaged and reflected therefrom. Subsequently, the second light beam 332 travels back into the prism module 35 through the first light output surface 354, and then, like the case of the first light beam 312, the second light beam 332 exits from the second light output surface 358 to travel into the lens device 39, where it is focused and projected onto the screen (not shown) to form an image. It should be noted that the second light source module 33 is disposed on the other side of the prism module 35 opposite to the first light source module 31 so that the direction of the incident light of the first and second light source modules 31, 33 with respect to the DMD 37 is symmetrically reversed. Therefore, the second image signal cooperated with the second light beam 332 to form the image should be opposite to the first image signal that corresponds with the first light beam 312 to form the same image. Specifically, if the first image signal is represented as a "high" signal then the second image signal is represented as a "low" signal. In contrary, if the first image signal is represented as a "low" signal then the second image signal is represented as a "high" signal.

In the first embodiment, both the first light source module 31 and the second light source module 33 are ultra high pressure (UHP) mercury lamps; however, in other examples, light emitting diode (LED) modules may also be used as light sources in the two light source modules 31, 33 to alternately operate according to the time sequence, which will be illustrated as follows.

Figure 6A:
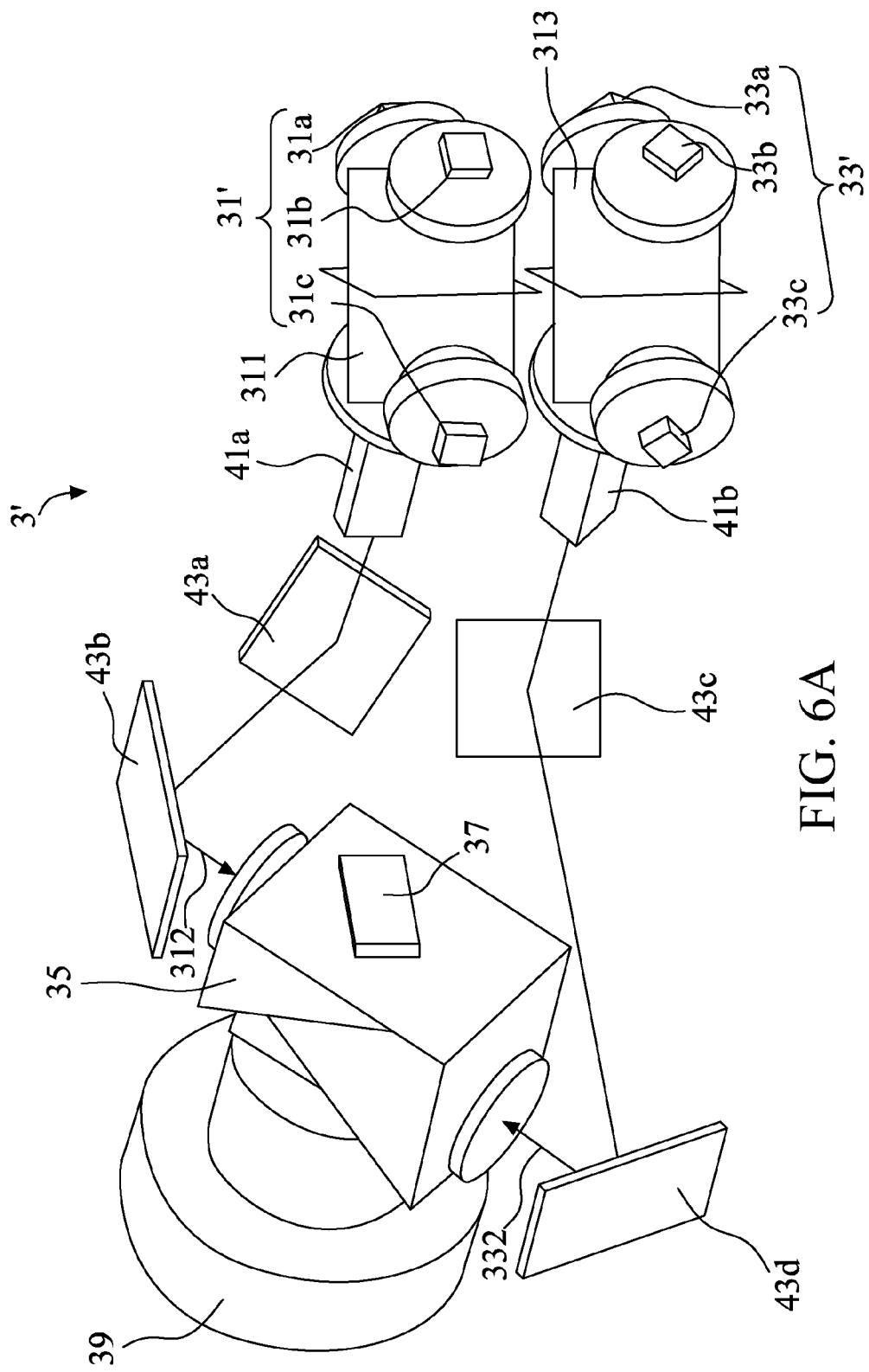
FIG. 6A is a schematic view illustrating the stacking of the light source modules in the projection system according to the second embodiment of this invention.

A projection system 3' according to a second embodiment of this invention is shown in FIG. 6A. In this embodiment, the two light source modules of the projection system 3' are a first LED module 31' and a second LED module 33'. Each of the LED modules 31', 33' comprises a red LED 31a, 33a, a green LED 31b, 33b and a blue LED 31c, 33c, and utilizes a light coupling plate 311, 313 (e.g., an X plate) to collect colored light generated by the LEDs of different colors. Thus, light beams generated by the LED modules 31', 33' are guided to the prism module 35.

In particular, upon receiving the first time sequence signal, the first LED module 31' generates the first light beam 312 according to the first time sequence. Depending on practical demands for light paths, the first light beam 312 is reflected by a first light collecting rod 41a and at least one reflecting minor 43a, 43b, and then transmits through the first light input surface 352 into the prism module 35. On the other hand, upon receiving the second time sequence signal, the second LED module 33' generates the second light beam 332 according to the second time sequence. Depending on the practical demands for light paths, the second light beam 332 is reflected by a second light collecting rod 41b and at least one reflecting mirror 43c, 43d, and then transmits through the second light input surface 356 into the prism module 35. After transmitting into the prism module 35, the first and the second light beams 312, 332 will follow the same path as in the first embodiment, and this will not be further described herein.

In this embodiment, as shown in FIG. 6A, the first and the second LED modules 31', 33' are stacked with each other. In this embodiment, the projection system 3' further comprises heat dissipation modules adapted to dissipate heat from the LED modules 31', 33'. The heat dissipation modules are also stacked with each other.

Figure 6B:
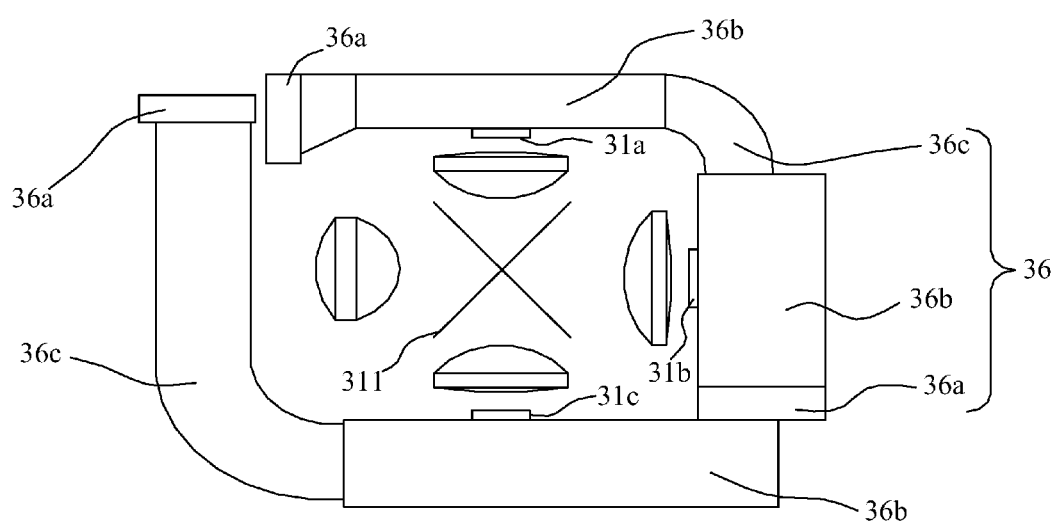
FIG. 6B is a schematic view illustrating a thermal module disposed adjacent to the light source module in the projection system according to the second embodiment of this invention.

As shown in FIG. 6B, the heat dissipation modules include a first thermal module 36 and a second thermal module (not shown). The first thermal module 36 is disposed according to the first LED module 31'. Similarly, the second thermal module (not shown) is disposed according to the second LED module 33'. The first thermal module 36 and the second thermal module (not shown) each consist of a plurality of fans 36a, a plurality of heat dissipation fins 36b and a plurality of air passages 36c. More specifically, the first thermal module 36 and the second thermal module surround the LED modules 31', 33' respectively with the heat dissipation fins 36b disposed adjacent to the LEDs. The air convection effect resulting from the plurality of fans 36a, will drive cooling air to flow through the plurality of heat dissipation fins 36b and the plurality of air passages 36c to achieve the heat dissipation effect.

Hence, by having the LED modules 31', 33' and the heat dissipation modules disposed together in a stacked configuration within the projection system 3', the complexity of the structural design can be decreased, thereby reducing the overall volume of the projection system 3' effectively. The heat dissipation modules are preferably formed integrally to further simplify the structural design and improve the heat dissipation effect. It should be noted that the heat dissipation modules of this embodiment are only provided for illustration, and other arrangements may readily occur to those skilled in the art. This embodiment is preferably applied in a projection apparatus that employs LEDs as light sources to improve the luminance of the projected images. It should be noted that the above descriptions are only provided for illustration but not to limit this invention.

Compared to the conventional projection systems with a single light source, the usage of the two light source modules in the projection system of this invention prevents damage of the single light source that would cause failure of the projection system and, thus, improves the luminance and reliability of the projection system. Furthermore, as compared to present projection systems which use two light source modules and switch between the light sources in a mechanical manner or by using additional DMDs, the projection system of this invention features a faster switching speed, smaller volume, lower cost and less light dissipation, thus satisfying the demands of the industry and users.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A projection system, comprising:
    a prism module, comprising a first light input surface, a second light input surface, a first light output surface and a second light output surface, and the prism module further defining a first reflection mechanism and a second reflection mechanism;
    a first light source module, providing a first light beam;
    a second light source module, providing a second light beam;
    a digital micromirror device (DMD), being disposed adjacent to the first light output surface and comprising a plurality of micro minors that face the first light output surface, the micro mirrors being adapted to tilt from a first angle to a second angle; and
    a projection lens, being disposed adjacent to the second light output surface; wherein:
        the first light beam is emitted from the first light input surface to transmit the prism module and after being reflected by the first reflection mechanism, the first light beam is emitted through the first light output surface to the micro mirrors of the DMD; when the micro minors are at the first angle, the first light beam is reflected into the prism module through the micro mirrors and emitted from the second light output surface into the projection lens;
        the second light beam is emitted from the second light input surface to transmit the prism module and after being reflected by the second reflection mechanism, the second light beam is emitted through the first light output surface to the micro mirrors of the DMD; when the micro mirrors are at the second angle, the second light beam is reflected into the prism module through the micro minors and emitted from the second light output surface into the projection lens; and
    wherein the first light source module and the second light source module are stacked with each other, and the first light beam and the second light beam enter the first light input surface and the second light input surface respectively after being reflected from at least one reflecting mirror.

2. The projection system as claimed in claim 1, wherein the prism module is a total internal reflection (TIR) prism module.

3. The projection system as claimed in claim 2, wherein the prism module comprises:
    a first prism, including a bottom side which defines the first light input surface;
    a second prism, including a lateral side which defines the second light input surface and a bottom side which defines the first light output surface; and
    a third prism, including an inclined side which defines the second light output surface.

4. The projection system as claimed in claim 3, wherein:
    the first prism further comprises a first lateral side and a second lateral side, the third prism further comprises a bottom side, wherein the first lateral side of the first prism is adjacent to the bottom side of the third prism and corresponds to each other to form the first reflection mechanism; and
    the second prism further comprises an inclined side, wherein the inclined side of the second prism is adjacent to the second lateral side of the first prism and corresponds to each other to form the second reflection mechanism.

5. The projection system as claimed in claim 3, wherein the first prism and the third prism define a first air gap therebetween, the first prism and the second prism defines a second air gap therebetween.

6. The projection system as claimed in claim 3, wherein the first prism is an isosceles triangle and both the second prism and the third prism are right triangle.

7. The projection system as claimed in claim 6, wherein the absolute values of the first angle and the second angle that the micro minors tilt are δ, each of the prisms provides an index of refraction n, the first prism comprises a first inner angle 2Φ, each of the second prism and the third prism comprises a second inner angle Φ defining a relationship of $\Phi=\sin^{-1}(1/n)-\sin^{-1}(\sin \delta/n)$.

8. The projection system as claimed in claim 1, wherein the first angle and the second angle are substantially symmetry equivalent angles.

9. The projection system as claimed in claim 8, wherein both the absolute values of the first angle and the second angle are 12°.

10. The projection system as claimed in claim 1, wherein the first light source module and the second light source module are ultra high pressure (UHP) mercury lamps.

11. The projection system as claimed in claim 1, wherein each of the light source modules comprises a red light-emitting diode, a blue light-emitting diode and a green light-emitting diode.

12. The projection system as claimed in claim 1, further comprising a first thermal module and a second thermal module disposed according to the first light source module and the second light source module respectively, wherein the first thermal module and the second thermal module are stacked with each other.

13. The projection system as claimed in claim 1, wherein the first light beam and the second light beam are provided by the first light source module and the second light source module according to a time sequence.

14. The projection system as claimed in claim 13, further comprising a first light source driver and a second light source driver.

15. The projection system as claimed in claim 14, wherein the first light source driver is electrically connected to the first light source module and the second light source module by a first switch.

16. The projection system as claimed in claim 15, wherein the second light source driver is electrically connected to the first light source module and the second light source module by a second switch.

17. The projection system as claimed in claim 16, further comprising a time sequence controller electrically connected to the first switch and the second switch.

18. The projection system as claimed in claim 1, wherein the projection system is a digital light processing (DLP) projection system.

19. A projection system, comprising:
   a prism module, comprising a first light input surface, a second light input surface, a first light output surface and a second light output surface, and the prism module further defining a first reflection mechanism and a second reflection mechanism;
   a first light source module, providing a first light beam;
   a second light source module, providing a second light beam;
   a digital micromirror device (DMD), being disposed adjacent to the first light output surface and comprising a plurality of micro minors that face the first light output surface, the micro mirrors being adapted to tilt from a first angle to a second angle; and
   a projection lens, being disposed adjacent to the second light output surface; wherein:
   the first light beam is emitted from the first light input surface to transmit the prism module and after being reflected by the first reflection mechanism, the first light beam is emitted through the first light output surface to the micro mirrors of the DMD; when the micro minors are at the first angle, the first light beam is reflected into the prism module through the micro mirrors and emitted from the second light output surface into the projection lens;
   the second light beam is emitted from the second light input surface to transmit the prism module and after being reflected by the second reflection mechanism, the second light beam is emitted through the first light output surface to the micro mirrors of the DMD; when the micro mirrors are at the second angle, the second light beam is reflected into the prism module through the micro minors and emitted from the second light output surface into the projection lens;
   a first thermal module and a second thermal module disposed according to the first light source module and the second light source module respectively, wherein the first thermal module and the second thermal module are stacked with each other.

* * * * *